May 16, 1961

L. R. DUNCAN 2,984,195

REINFORCED REFRACTORY BRICK

Filed June 19, 1958

2 Sheets-Sheet 1

INVENTOR.
LORNE R. DUNCAN
BY
Brown, Critchlow, Flick & Peckham
His Attorneys

United States Patent Office 2,984,195
Patented May 16, 1961

2,984,195

REINFORCED REFRACTORY BRICK

Lorne Robert Duncan, Grenville, Quebec, Canada, assignor to Harbison-Walker Refractories Company, Pittsburgh, Pa., a corporation of Pennsylvania Filed June 19, 1958, Ser. No. 743,214

2 Claims. (Cl. 110—99)

This invention relates to internally metal reinforced refractory bricks and to a method for making the same.

Refractory bricks are subject to spalling in use at very high temperatures. The hottest face of the brick will tend to crack in a plane substantially parallel to the hot face. It has been found that by positioning a metal plate in a refractory brick so as to interrupt the plane in which cracking of the brick occurs, the tendency to crack is greatly reduced. A plate so positioned will conduct heat away from the hot face thereby reducing the unbalance of stress on the brick. Further, it is desirable that the reinforcing plate should support the portions of the brick which are most susceptible to cracking.

An object of the invention is to provide a refractory brick having a metal reinforcement member of substantially U-form and capable of convenient incorporation therein, such member being of improved effectiveness in imparting strength and non-spalling properties to the brick.

A further object is to provide a simple method of incorporating metal reinforcing means in a refractory brick.

Figure 1:
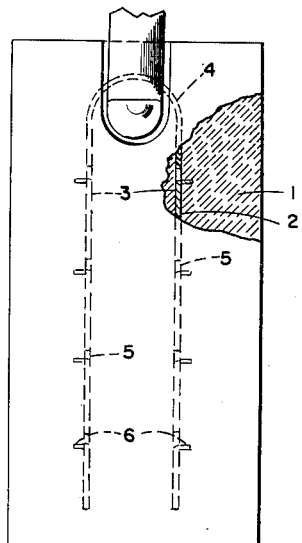

The invention will be described with reference to the accompanying drawing in which, Figure 1 is a side elevation, partly in section, of a refractory brick in accordance with one embodiment of the invention.

Figure 2:
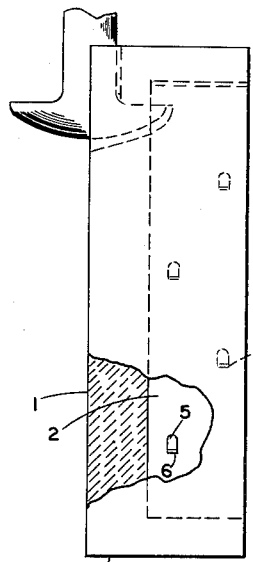
Figure 5:
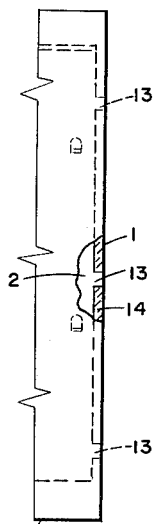
Figure 3:
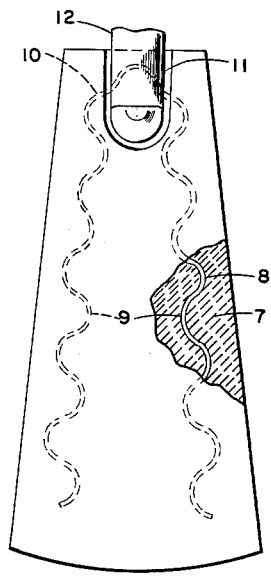
Figure 4:
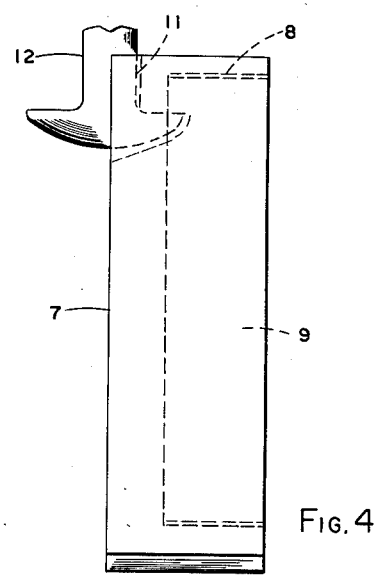
Figure 8:
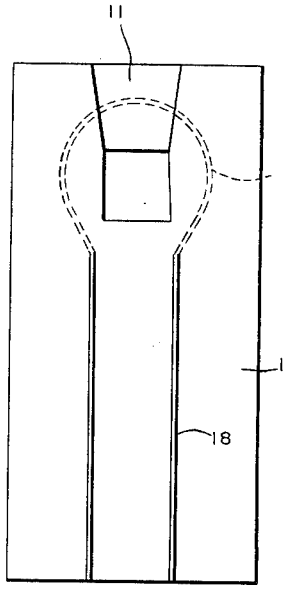
Figure 9:
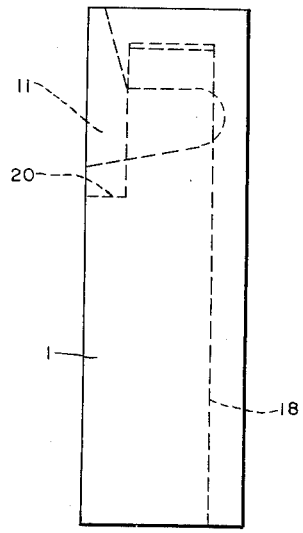
Figure 7:
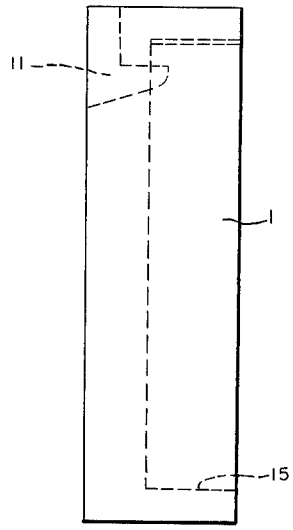
Figure 6:
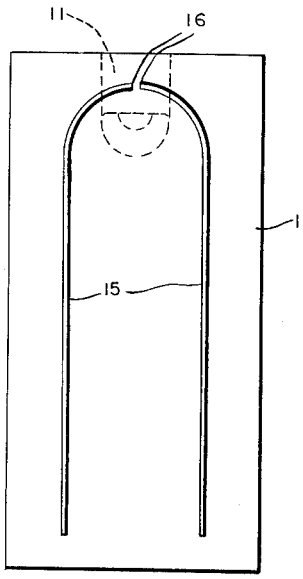

Figure 2 is an edge elevation, partly in section, of the brick shown in Figure 1, Figure 3 is a side elevation, partly in section, of another embodiment of the invention, Figure 4 is an edge elevation of the brick shown in Figure 3, Figure 5 is a partial edge elevation, partly in section, of a slightly modified form of the brick shown in Figure 1, Figure 6 is a side elevation of another embodiment of the invention, Figure 7 is an edge elevation of the brick shown in Figure 6, Figure 8 is a side elevation of still another embodiment of the invention, and Figure 9 is an edge elevation of the brick shown in Figure 8.

In Figures 1 and 2, 1 is a refractory brick having longitudinally positioned therein an inverted U-shaped metal reinforcing plate 2. Plate 2 has a pair of side legs or portions 3 extending longitudinally through substantially the length of the brick and a minor curved web portion 4 extending transversely of the brick.

The plate is preferably positioned so that the legs 3 are perpendicular to the plane in which pressure is applied to the brick in moulding. Preferably the plate extends to within one inch of, and is perpendicular to, the surface or surfaces 1a of the brick which will experience the highest temperature in use, since cracking of the brick normally occurs about one inch from such surface. Thus, the portion of the brick most susceptible to cracking is divided into three preferably equal parts, thereby greatly reducing the tendency of the brick to crack and spall off.

The depth of the plate should be at least half the thickness of the brick. The plate may extend transversely through the entire thickness of the brick and, in such case, holes 5 may be provided in the plate so that the three portions of the brick will be more strongly bonded together. The holes may be formed either by stamping pieces from the plate or preferably by punching portions from the plate right angularly to the plate. The lugs 6 so formed will provide additional support and assist in bonding the brick portions together.

Figures 3 and 4 show a wedge shaped brick 7 of the type adapted particularly for curved furnace roofs and the like. Metal reinforcing plate 8 has a pair of major angularly disposed corrugated leg portions 9 extending longitudinally through the brick, and a curved web portion 10 extending transversely of the brick. The corrugations will tend to directly support and retain in position any cracked portion of the brick which may occur. The corrugations may be rounded as shown or folded more angularly, as desired.

Figure 5 shows the reinforcing plate 2 with small lugs 13 projecting from the edge 14 lying adjacent one side face of the brick. These lugs space the edge 14 of the plate slightly from the surface of the brick during molding thereof and at the same time allow the major surfaces of the plate to be covered with refractory materials.

The brick may be provided with hanger receiving recesses therein. The drawings show a recess 11 for a conventional type of hanger 12. The web portion 4 or 10 of the reinforcing plate may overlie the hanger recess to provide reinforcement of the area of the brick which will bear the weight of the brick in hanging position. Any type of hanger may be used. The plate may be notched as required so that it will not extend undesirably into the hanger recess. The reinforcement provided by the inverted substantially U-shaped plate in accordance with this invention adds greatly to the strength of the recessed portion of the brick.

To form the reinforced brick, a metal plate 2 or 8 is positioned centrally in the mould to form an inverted U therein and generally divide the mould longitudinally into three preferably substantially equal portions. Refractory material is fed into the mould and pressed to consolidate the material around the plate. A suspension hanger opening may be moulded into the brick. The brick is then extruded from the mould and allowed to set. The plate may either be placed in position on the bottom platen of the mould or may be magnetically held on the upper platen. In either case, by virtue of its shape, the plate will remain in position without the necessity of lateral support. It is desirable that the plate be at least of slightly smaller depth than the desired thickness of the brick since, in practice, the thickness of the brick may vary somewhat and the plate should not protrude from the brick.

In Figures 6 and 7, a modification is shown wherein the metal reinforcement member is in two similar sections 15, which, during formation of the brick, are positioned as shown to form a U-shaped member. The adjoining edges 16 of the two sections may be in substantially abutting relation or there may be a slight gap 17 therebetween. Preferably, this gap should not be substantially more than three quarters of an inch to ensure support.

Referring to Figures 8 and 9, the metal reinforcement member comprises a U-shaped plate 18 which, in this instance, has one of its longitudinal edges located flush with the hanger-receiving face of the brick while the other longitudinal edge is spaced from the other side face of the brick. Because of the presence of the hanger recess 11, the web end of the plate 18 is outwardly bowed at 19 to space it from the walls of the transversely extending portion of the recess. It is also provided with a marginal recess 20 to space it from the wall of the longitudinally extending portion of the recess. This modification provides greatly increased reinforcement about the hanger recess, such reinforcement being highly desirable. It also has the advantage that the metal insert is almost completely embedded in the refractory material of the brick and is thereby protected from rapid oxidation.

I claim:

1. A metal-reinforced refractory brick for use in upright position and having a reinforcing metal strip moulded therein, the brick being provided near its upper end with a hanger recess extending into it from one side, the top of the inner portion of the recess being spaced from the upper end of the brick, said reinforcing strip having a pair of laterally spaced upright leg portions extending lengthwise of the brick for more than half its length and connected at their tops by an upwardly arched web portion embedded in the brick above and at opposite sides of said recess to straddle it, and said web portion being spaced from the recess and the upper end of the brick.

2. A metal-reinforced refractory brick for use in upright position and having a reinforcing metal strip moulded therein, the brick being provided near its upper end with a hanger recess extending into it from one side, the top of the inner portion of the recess being spaced from the upper end of the brick, said reinforcing strip having a pair of laterally spaced upright leg portions extending lengthwise of the brick for more than half its length and connected at their tops by an upwardly arched web portion embedded in the brick above and at opposite sides of said recess to straddle it, and said web portion being spaced from the recess and the upper end of the brick and bowed outwardly from opposite sides of the recess.

References Cited in the file of this patent

UNITED STATES PATENTS

| | | |
|---|---|---|
| 1,500,240 | Griffith | July 8, 1924 |
| 2,398,622 | Crncich | Apr. 16, 1946 |
| 2,527,063 | Heuer | Oct. 24, 1950 |
| 2,673,373 | Heuer | Mar. 30, 1954 |
| 2,846,963 | Mason et al. | Aug. 12, 1958 |